Dec. 21, 1943. W. A. ROTH 2,337,499
AUTOMATIC HYDRAULIC TRANSMISSION
Filed Dec. 1, 1939 2 Sheets-Sheet 2

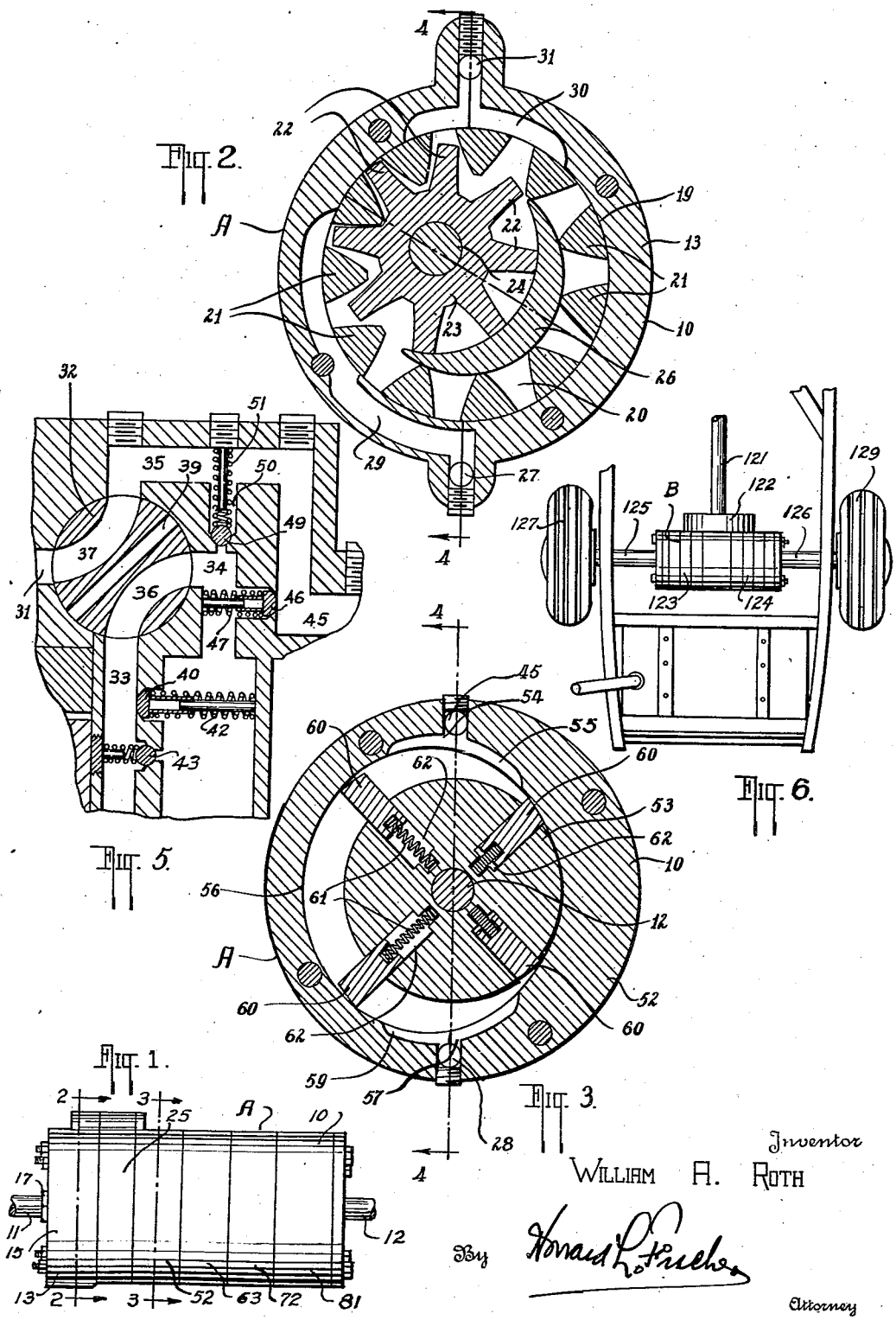

Inventor
WILLIAM A ROTH
By Howard Fischer
Attorney

Patented Dec. 21, 1943

2,337,499

UNITED STATES PATENT OFFICE 2,337,499

AUTOMATIC HYDRAULIC TRANSMISSION

William A. Roth, St. Paul, Minn., assignor of fifteen per cent to John E. Nekowitsch, fifteen per cent to Steve Nekowitsch, fifteen per cent to Melvin O. Museus, all of St. Paul, Minn., and fifteen per cent to Paul Vance, South St. Paul, Minn.

Application December 1, 1939, Serial No. 307,104

4 Claims. (Cl. 60—53)

My invention relates to an improvement in automatic hydraulic transmissions, wherein it is desired to provide a transmission which operates automatically to drive a shaft at a variable speed depending upon the speed and torque of the driven shaft.

It is an object of the present invention to provide a transmission which will drive a shaft with more or less power depending upon the speed and torque of this driven shaft. Thus my transmission may be used for automobiles, locomotives, motor boats, ships, airplanes and the like, wherein it is desired to provide a means of changing the power ratio between the driving and the driven shafts. This I accomplish with no mechanical connection between the driving and driven shafts, the only connection between these shafts being through the medium of hydraulic power which provides a more even flow of power than is usually possible with various other types of transmissions.

It is an object of the present invention to provide upon the driving shaft a source of fluid pressure in the form of a hydraulic pump or the like for operating suitable mechanism on the driven shaft. It is also a feature of my invention to provide in combination with this source of hydraulic power a series of driven units connected to the driven shaft. These driven units are connected to the source of hydraulic power in such a way that the various units may be selectively connected with the source of hydraulic liquid. If all of the driven units of the series are subjected to the force of hydraulic power, a greater power is exerted upon the driven shaft with a reduction in speed of this driven shaft. If a lesser number of driven units are operatively connected to the source of hydraulic power, the speed of the driven shaft is relatively increased. If but a single driven unit is supplied with hydraulic fluid under pressure, the speed of the driven shaft is increased relative to the speed of the drive shaft. Thus by varying the number of units to which fluid under pressure is delivered, the speed of the driven shaft relative to the drive shaft can be varied.

It is a feature of my invention that when the torque load upon the driven shaft increases, the number of units supplied with hydraulic fluid increases. Thus when extreme power is needed, as for example, when a vehicle climbs an extremely steep incline, or passes through mud or water, the back pressure of the fluid delivered from the supply pump increases, tending to open passages to additional units on the driven shaft. If my drive device is considered secured to a motor vehicle, it will be found that the high torque caused by starting the vehicle will create sufficient pressure to open the passage to all of the driven units, thus obtaining a high starting torque with a low speed of the driven shaft relative to the drive shaft. As the vehicle continues movement, the passages to the additional units are gradually closed, until at a high rate of speed all but one of the drive units are closed, and all of the fluid from the supply pump passes through a single driven unit.

It is a feature of my invention to provide a governor on the driven shaft which regulates a valve means in the passage to the various units on the driven shaft. Thus at low speeds all of the passages to the various units are open so that the fluid pressure developed in the supply pump may be directed to all of the units to supply the necessary power. As the rate of speed of the driven shaft increases, the governor tends to gradually close the passages to the units with the exception of a main driven unit which is at all times during the movement of the driven shaft operatively connected to the power supply.

It is a purpose of my invention to provide a hydraulic unit which may take the place of the usual clutch, transmission, and differential of a motor vehicle. By merely manipulating a main control valve, it is possible to direct the fluid power generated by the vehicle pump either directly to the fluid reservoir in which case no tendency is exerted to move the vehicle in either direction, or to either side of the driven units so that the vehicle may be driven selectively in either direction. Thus by the manipulation of a single valve, my transmission may be actuated to hold the vehicle stationary or to cause movement of the vehicle in either direction.

It is a further feature of my invention to provide a transmission which operates as a brake when set in neutral position. When in this position the driven units provide back pressure resisting rotation of the drive shaft. If the driven shaft is rotated from an external source, such as by rotation of the drive wheels of the vehicle while the main control valve is in neutral position, this rotation of the drive shaft causes the driven units to act as fluid pumps which pump liquid against a considerable back pressure. Safety valves are provided in the fluid passages to prevent injury to the transmission due to excessive pressure created in this way. It will be understood, however, that considerable back pressure must be built up before the pressure is released by the safety valve, and accordingly the rotation of the driven shaft is impeded considerably by this action. Thus my transmission may act as a brake to resist movement of the drive wheels.

These and other objects and novel features of my invention will be more clearly and fully set forth in the following specification and claims.

In the drawings forming a part of my specification:

Figure 1 is a side elevation view of my transmission.

Figure 2 is a cross-sectional view on the line 2—2 of Figure 1.

Figure 3 is a cross-sectional view on the line 3—3 of Figure 1.

Figure 5 is an enlarged sectional view of the main control valve and the various passages associated therewith.

Figure 6 is a diagrammatic plan view of the rear end of an automobile chassis, illustrating my transmission applied thereto.

Figure 4:
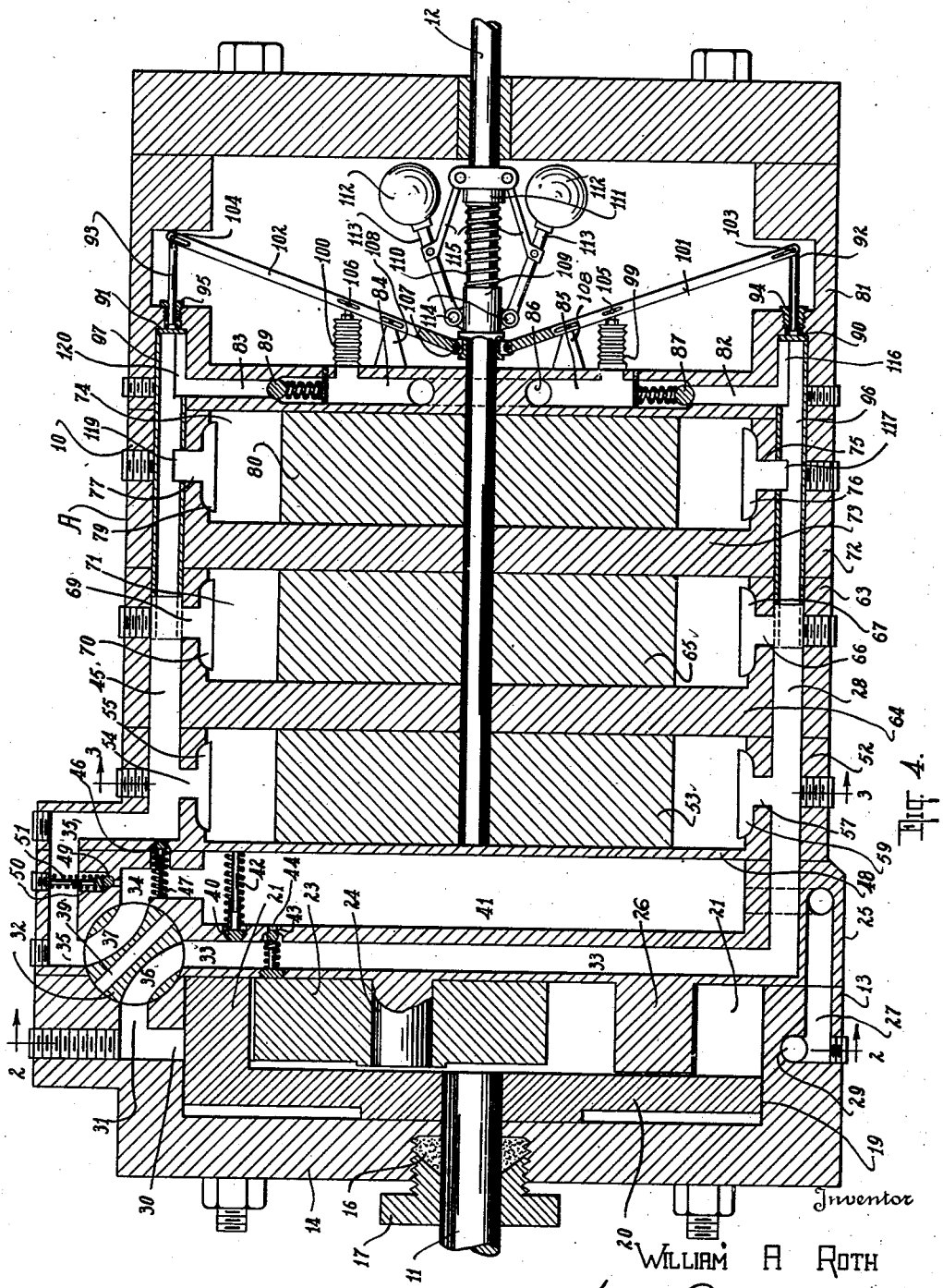
Figure 4 is an enlarged longitudinal section through my transmission, the position of the sections through the drive pump and the driven units being indicated by the lines 4—4 of Figures 2 and 3.

The transmission A includes an elongated substantially cylindrical casing 10 formed of a series of sections which will be described in detail. A drive shaft 11 extends into one end of the casing 10 while a driven shaft 12 may extend from the opposite end thereof. In the form illustrated, the shafts 11 and 12 are arranged coaxially, but it will become apparent in the following description that any desired angle may be provided between the driving and driven shafts.

The drive shaft 11 extends into an end section 13 of the casing 10. This end section is provided with an end wall 14 and a cylindrical wall 15 secured to the end wall. The shaft 11 extends through the center of the end wall 14, passing through a packing gland 16 provided with a packing nut 17.

A cylindrical bore 19 is provided in the section 13 forming a cylinder in which is provided a pressure developing pump. A disc 20 is mounted upon the shaft 11 to rotate therewith. A series of inwardly extending teeth 21 are provided on the disc 20 to rotate therewith. These teeth mesh with the teeth 22 of an idle rotor 23 rotatable on a suitable shaft 24 projecting from the next adjacent section 25 of the casing 10. The stub shaft 24 is considerably eccentric from the center of the disc 20 and the idle gear or rotor 23 is of substantially smaller outer diameter than the disc 20. A crescent-shaped projection 26 on the next section 25 of the pump fills the space between the teeth 22 of the rotary gear 23 and the teeth 21 on the disc 20.

Rotation of the disc 20 by the shaft 11 causes rotation of the teeth 21 and subsequent rotation of the meshing gear rotor 23. Fluid entering the inlet passage 27 passes through the peripheral passage 29 and enters the casing between the teeth 21 on the disc 20. The oil cannot move in a clockwise direction because of the counterclockwise movement of the disc 20 and the teeth 21. As the gear 23 is also rotated in a counterclockwise direction by the teeth 21, there is no remaining space in which oil may flow in a clockwise direction. The oil is thus carried in a counter-clockwise direction to the outlet passage 30 which is in communication with the longitudinal passage 31 in the section 13 of the casing 10. At this point the teeth 22 of the rotor gear 23 fit tightly against the teeth 21 of the disc 20 and as the liquid cannot be compressed to any extent, this liquid is forced from between the teeth out through the discharge passages 30 and 31.

A valve 32 is interposed in the passageway 31. This valve is a four-way valve and the liquid pumped by the fluid pump just described may be directed to any one of three separate ports connected to passages 33, 34, and 35 projecting outwardly from the valve 32, spaced ninety degrees apart. The passages 33 and 35 are arranged at ninety degrees with the passage 31. Thus I am able to provide in the valve 32 a pair of arcuated connecting passages 36 and 37. When in the position illustrated in Figure 4 of the drawings, the curved passageway 36 connects the passage 31 with the passage 33, while the passage 37 through the valve simultaneously connects the passages 34 and 35. A central passage 39 through the valve is closed and sealed while the valve 32 is in either of the positions mentioned. When the valve 32 is turned in an intermediate position, however, the passage 31 is connected directly to the passage 34, while the passages 33 and 35 are sealed.

The passage 33 extends transversely across the second section 25 and communicates with a longitudinally extending passage 28. A safety valve 40 is provided in the section 25 between the passage 33 and the reservoir 41. This safety valve 40 is urged by the spring 42 into sealed position, and if the pressure in the passage 33 increases to an abnormal extent, the spring 42 may compress to release certain of the pressure.

A check valve 43 is also provided in a passage 44 between the passage 33 and the reservoir 41. This check valve 43 is normally closed at all times, but when the end of the passage is sealed by valve 32 and sufficient suction is created by movement of the driven rotor, which will be later described, on the driven shaft 12 when this shaft is rotated, the check valve 43 may open and permit fluid to enter the passage 33 forming an inlet to the driven rotors.

The passage 34 is directly opposed to the passage 31 and extends from the valve 32 to the reservoir 41. The passage 35 communicates with an elongated tubular passageway 45 connected collectively to the various driven units. A safety valve 46 is positioned in the passage 35 and communicates with the passage 34. This safety valve is at all times normally closed and urged into closed position by a spring 47. When abnormal pressure builds up in the passages 35 and 45, the spring 47 will compress to permit the escape of some of this high pressure liquid. Obviously this high pressure liquid is directed into the passage 34 leading to the exhaust.

A check valve 49 is interposed in a passage 50 between the passageways 35 and 34. The check valve 49 is normally held closed by a spring 51, but when the end of the passage 35 is sealed by the valve 32 in intermediate position of the valve, any suction created in the passage 45 may open this check valve and permit liquid to flow from the reservoir 41 into the passages 35 and 45.

A section 52 is secured adjacent a section 25. The section 52 includes a partition wall 48 and a hollowed central bore to accommodate a driven rotor such as 53 illustrated in Figure 3 of the drawings. This figure discloses a transverse section through the motor and shows the construction of the elements within the section 52.

With particular reference to Figure 3 of the drawings it will be noted that the passage 45 is connected by a passage 54 to an inlet or outlet port 55 in the periphery of the hollow bore 56. It will also be noted that the passage 28 is connected by a short passage 57 to an inlet or outlet port 59 in the periphery of the section 52. A cylindrical rotor 53 is mounted upon the shaft 12 and is so arranged that the rotor extends closely adjacent the wall of the hollow bore 56 on one side thereof and is spaced considerably from the hollow bore 56 on the other side of the rotor. In other words, the hollow bore 56 is eccentric with respect to the rotor, one wall thereof virtually contacting a surface of the rotor.

The rotor 53 is provided with a series of angularly spaced radially movable vanes 60 which are free to slide radially and are urged by springs 61 into constant contact with the inner surface of the hollow bore 56. Thus as the rotor 53 rotates with the shaft 12, the blades or vanes 60 slide into and out of recesses 62 in the rotor 53 provided for that purpose.

Fluid under pressure may be directed through either the passage 45 or the passage 28. If the fluid is entering through the passage 28, it will flow through the connecting passage 57, through the peripheral port 59, and into the space between the rotor 53 and two adjacent blades 60. It will be noted, however, that the blade 60 to the left of the passage 57 extends outwardly to a greater extent than the blade 60 to the right of this inlet passage. Thus the liquid will act upon the blade 60 to the left of the inlet with a greater force because of the greater surface area thereof exposed, causing the rotor 53 to rotate in a clockwise direction. This liquid is carried in a clockwise direction until the first blade 60 passes the peripheral port 55 of the passages 54 and 45 which at this time are acting as outlet passages. The liquid is forced through these outlet passages 54 and 45. If liquid is forced through these passages 45 and 54, respectively, a greater pressure is exerted on the vane 60 to the left of the intake port, and the rotor 53 is rotated in a counter-clockwise direction. Thus when high pressure liquid is selectively directed to either the passage 28 or the passage 45, the rotor 53 is rotated in one direction or the other.

A section 63 is secured adjacent the section 52. This section 63 is similar to the section 52 and includes a partition wall 64, a rotor 65 mounted upon the shaft 12, which rotor is similar to the rotor 53 which has been described. A connecting passage 66 connects the longitudinally extending passage 28 to the inlet or outlet port 67 which is similar to the port 59 of Figure 3. A connecting passage 69 is also provided between the longitudinally extending passage 45 and the inlet or outlet port 70 which is identical to the port 55. The hollow bore 71 of the section 63 is identical to the hollow bore 56 previously described.

Any number of sections such as 63 may be provided without changing the principles of the present invention. If it is desired, only the sections described may be used. For the purpose of illustration a series of sections may be provided. I disclose an additional section 72 secured adjacent the section 63. This section is identical to the section 63 and includes a partition wall 73 which spaces the hollow bore 71 from the bore 74 of section 72. A connecting passage 75 connects the longitudinally extending passage 28 to the port 76 identical to the port 59 of Figure 3, and a connecting passage 77 connects the passage 45 with the port 79 identical to the port 55 in Figure 3. A rotor 80 is mounted upon the shaft 12 within the hollow bore 74 which is identical to the bore 56 of Figure 3.

A section 81 is secured adjacent the section 72. This section is provided with a transverse passage including inwardly extending end passage portions 82 and 83 and larger diameter connecting passage portions 84 and 85 connected by an arcuated passage 86. A check valve 87 is interposed between the connecting passages 82 and 85, and a check valve 89 is provided between the connecting passages 83 and 84. The valves 87 and 89 leak slightly to gradually equalize and maintain equalized pressure between the space between the valves and the high pressure line.

The elongated longitudinal passages 28 and 45 terminate in shoulders 90 and 91. A valve rod 92 and 93 respectively, extends through the end shoulder 90 or 91, passing through a packing gland 94 or 95. The valve rods 92 and 93 are connected to slide valves 96 and 97, respectively, in the passages 28 and 45, the operation of which will be later described in detail.

Expandable diaphragms 99 and 100 are connected in the connecting passages 84 and 85. As there is no valve interposed between these diaphragms it will be obvious that they operate in unison. Levers 101 and 102 are hingedly and slidably connected at 103 and 104 to the valve rods 92 and 93. These levers are also hingedly and slidably connected at 105 and 106 to the diaphragms 99 and 100, and to fixed fulcrums 108. The inner extremities of the levers 101 and 102 are pivoted to a collar 107 which is longitudinally movable along the shaft 12 when the rotatable collar 109 is so moved. A spring 110 interposed between the slidable collar 109 and the fixed collar 111 tends to urge the lever arms connected thereto to the left as viewed in Figure 4.

Governor weights 112 are mounted on arms 113, pivoted at 114 to the slidable sleeve 109, and links 115 pivotally connected to the links 113 and to the fixed sleeve 111 connect these governor weights to the fixed sleeve. The governor thus formed acts in the usual manner upon an increase in speed to compress the spring 110 and to pivot the inner ends of the levers 101 and 102 to the right, thus urging the valve rods 95 inwardly or to the left in the passages 28 and 45.

Having now described the construction of this form of my invention, the operation thereof is substantially as follows: Rotation of the drive shaft 11 by the engine of the vehicle causes rotation of the disc 20 and the teeth 21, rotating the rotary gear 23, meshing therewith. This action causes fluid to be drawn through the passage 27 connecting with the reservoir 41 and through the inlet passage 29 of the driving pump, causing this liquid to be forced under pressure through the outlet 30 and the connecting passage 31. The valve 32 in the passage 31 may be set in three different positions. If this valve is set in the position illustrated in Figure 4, the arcuated passageway 36 therethrough connects the passage 31 with the passage 33. Thus liquid under pressure is forced through the passage 33 and the connecting passage 28 entering the passage 57 and the intake port 59 of the rotor 53. This causes oil under pressure to bear against the blade 60 to the left of the intake and tends to urge the rotor 53 in a clockwise direction.

If the transmission A is attached to a motor vehicle or the like, there will be a large starting torque so that the oil pressure acting in the main driven unit in section 52 will not provide enough force to rotate the shaft 12. This creates a back pressure which is transmitted through the hollow valve 96 normally in the position shown in dotted outline. This pressure passing through the valve 96 passes through a port 116 and therefore travels through the port 82 opening the check valve 87. This permits the oil under pressure to enter the passages 84 and 85 connected by the passage 86 and acts to expand the diaphragms 99 and 100. This pressure acts against the check valve 89 to practically entirely close the same, however, the valve 89 will leak slightly.

The expansion of the bellows or diaphragms 99 and 100 acts to pivot the levers 101 and 102 outwardly at their outer ends, pulling the valve rods 92 and 93 outwardly. As the valve rods 92, 93 move outwardly, the valves 96 and 97 also move outwardly. After the valve 96 moves a short distance to the right, the end of the valve uncovers the passage 66 to the port 67 and further movement of the valve 96 moves a port 117 in the valve 96 into registry with the passage 75 to the port 76. Simultaneously, movement of the valve 97 to the right causes the end of the valve 97 to uncover the passage 69 to the port 70 and then causes the port 119 to move into registry with the passage 77 to the port 79. Thus as the expandable members 99 and 100 expand with oil pressure, the valves 96 and 97 to move to the right, uncovering ports to both of the rotors 65 and 80 in the sections 63 and 72, respectively.

Thus when pressure builds up within the passage 33 and the passage 28, the expandable members or diaphragms 99 and 100 act to move the valves 96 and 97 into a position to permit the liquid under pressure to enter all of the ports 59, 67 and 76 in the transmission sections 52, 63, and 72, respectively, which positions of the various parts are shown in Figure 4.

The oil entering these various sections is urged by the vanes or blades out through the outlet ports 55, 70 and 79 which are connected by the passages 54, 69, and 77 to the longitudinal passage 45. It will be noted that the passage 45 connects with the passage 35 which in turn is connected by the arcuated passage 37 to the passage 34 connected to the reservoir 41. Thus the discharge from the various rotors 53, 65, and 80 is expelled into the reservoir 41 along an unrestricted path.

As the speed of rotation of the shaft 12 increases and as the back pressure upon the liquid in the passage 28 decreases, the pressure on the expandable members 99 and 100 may be relieved to some extent. Simultaneously, the governor weights 112 move outwardly, pivoting the inner ends of the levers 101 and 102 to the right as viewed in Figure 4. This action gradually moves the valves 96 and 97 to the left. The valves 87 and 89 leak slightly to gradually equalize and maintain equalized pressure between the space between the valves and the high pressure line. It will be noted that movement of the valve 96 to the left gradually cuts off the flow of liquid to the passage 75 and after the passage 75 is completely closed, the end of the valve 96 gradually closes the passage 66. Simultaneously, the valve 97 in its movement to the left gradually shuts off the passage 77, and when this passage is completely closed, the end of the valve 97 gradually closes the passage 69. Thus when the speed of rotation of the shaft 12 reaches a predetermined amount, the passages to sections 63 and 72 are closed and all of the fluid pressure generated by the pump in section 13 is directed to the main driven rotor 53 in section 52. The valves 96 and 97 are sufficiently loose to permit a certain amount of leakage from the sections 63 and 72 to prevent oil pressure from being built up within these sections which cannot escape.

It is not necessary that the valves 96 and 97 be formed loose in the passages 28 and 45 if safety valves are provided between the various outlet ports and their adjacent passage 28 or 45. Obviously, safety valves in the outlet could be provided which would open in case of excessive pressure to exhaust this pressure.

In Figure 5 of the drawings I disclose the valve 32 turned into position to introduce oil under pressure to the passage 35 and consequently the passage 45, while the passage 33 and the connecting passage 28 are in communication with the exhaust passage 34 to the reservoir 41. When the valve 32 is turned into this position, fluid under pressure is forced through the passage 45 and passes through the inlet port 55 to rotate the rotor 53 in a counter-clockwise direction as viewed in Figure 3. The operation is similar to that previously outlined. If the torque upon the driven shaft 12 is excessive, the fluid pressure will be transmitted through the port 120 to the passage 83, opening the check valve 89. This movement permits pressure to be transmitted to the connecting passages 84 and 85, actuating the expandable members 99 and 100 to pivot the levers 101, 102 to pull the valves 96 and 97 toward wide open position, illustrated in full lines in Figure 4 of the drawings. When the pressure upon the expandable members 99 and 100 decreases, or when the speed of the shaft 12 increases to such an extent that the governor weights 112 move the valves 96 and 97, the passages 77 and 69 to the rotors 80 and 65 respectively, will be gradually cut off. The check valve 87 will be held in a practically closed position by the pressure within the passage 85, but will be adapted to leak slightly.

Thus it will be seen that when greater force or power is needed, the valves 96 and 97 will move into open position permitting the oil to enter and rotate the rotors 65 and 80. The valves 87 and 89 are adapted to leak slightly to gradually equalize and maintain equalized pressure between the space between the valves and the high pressure line. As less power is required, the rotor 80 will be gradually cut from its fluid supply and upon an additional increase in speed of the driven shaft, or decrease in resistance upon the oil, the fluid pressure will be cut from the rotor 65. When in this condition, all of the fluid pressure from the fluid pump in section 13 must pass by the rotor 53 in section 52, and therefore the shaft 12 will be driven at high speed. If the relative sizes of the pump 23 in section 13 and the rotor 53 in section 52 are properly adjusted, the main driven unit will act as an overdrive to drive the shaft 12 faster than the shaft 11.

The valve 32 may also be turned into intermediate position in which a passage is formed between the outlet of the pressure supply pump and the exhaust passage 34 to the reservoir 41. In this position, the passage 39 extends between the passage 31 and the passage 34. The ends of the passages 33 and 35 are thus closed by the solid portion of the valve 32.

When the valve 32 is turned into this position, my transmission acts as a brake to restrict movement of the driven shaft 12. If the valve 32 is placed in this position while the wheels of the vehicle are rotating, the shaft 12 will be rotated, thereby rotating the rotors 53, 66 and 80, or in any event will be driving the rotor 53, which at all times is in constant communication with the passages 28 and 45. This rotation of the rotor 53 creates a suction in either the passage 28 or the passage 45 and creates a pressure in the other of these passages. When the shaft 12 is rotated in one direction, a pressure will be created in the port 59 and passage 57 and in the communicating passages 28 and 33. As the end of the passage 33 is sealed, the liquid pressure built up would have no means of escape unless a safety valve such as 40 were provided. With this safety valve 40, however, it will be found that any excessive pressure built up in the passage 33 will compress the spring 42 and permit the liquid under pressure to be exhausted into the reservoir 41. However, as a certain amount of back pressure is required to open the safety valve 40, rotation of the shaft 12 will be restricted thereby and the transmission will act as a brake upon the shaft 12.

Simultaneously with the building up of a pressure in the port 59, a suction will be created in the port 55 and passage 54, and accordingly, in the passage 35. This suction cannot be transmitted through the valve 32 which closes the end of this passage. The suction will, however, draw the check valve 49 from its seat, allowing liquid from the reservoir 41 to flow into the passage 35. Thus liquid may be circulated by the rotor 53, even though the ends of the passages 33 and 35 are closed, by operating the safety valve in one passage and a check valve in the other.

A similar action takes place if the shaft 12 is rotated in the other direction. A pressure will then be built up by the rotor 53 in the exhaust 55 and passage 54 which is transmitted into the passage 35. This pressure acts upon the safety valve 46 to compress the spring 47 and release the liquid into the passage 34 leading to the reservoir 41. Simultaneously, a suction is created in the port 59, passage 57, and passages 28 and 33. This causes the check valve 43 to be lifted from its seat permitting liquid to flow through the passage 44 into the passage 33 to supply liquid to the rotor 53.

In Figure 6 of the drawings I disclose a transmission B attached to the rear axle of a motor vehicle. In this form of construction the drive shaft 121 rotates a suitable pump within the pump unit 122 providing a source of hydraulic pressure for a pair of separate driven units 123 and 124. Each of the units 123 and 124 may be similar to the transmission A. The axle shafts to the individual wheels extending through the housings 125 and 126 respectively, drive the drive wheels 127 and 129 relatively at varying rates of speed. The different lengths of travel of each of the rear wheels of the vehicle may therefore be compensated for.

In actual practice, the valve 32 may be connected to the foot brake of a vehicle in such a manner that as the brake lever is depressed, the valve 32 is turned into intermediate position, regardless of the former position thereof. A valve operating lever may, in central position, hold the valve 32 in neutral position, and may be rotated one way or the other to turn the valve into forward or reverse positions. A V-shaped or funnel-shaped cam operated by depression of the foot brake may move the operating lever to this central position as the brake lever is depressed. Thus, the transmission A may act as a brake before the usual brakes are actually applied.

It will be understood that my transmission is capable of a greater number of uses and that it may be effectively operated to drive a driven shaft at a variable speed with respect to the drive shaft. It will also be understood that such a transmission may take the place of a clutch, transmission, and differential of a motor vehicle of usual construction. The ability of this transmission to reverse presents the possibility of quick reversal of driven shafts for vehicle or airplane or other use.

In accordance with the patent statutes, I have described the principles of construction and operation of my transmission; and while I have endeavored to set forth the best embodiments thereof, I desire to have it understood that these are only illustrative of a means of carrying out my invention, and that obvious changes may be made within the scope of the following claims without departing from the spirit of my invention.

I claim:

1. A fluid transmission comprising a source of fluid pressure, a casing, a series of fluid driven rotors therein, a shaft on which said rotors are mounted, means connecting said source of fluid pressure to said rotors, slidable valve means in said connecting means, said slidable valve means adapted to vary the number of rotors operatively connected to said pressure source, means operable by an increase in pressure of fluid in said connecting means to control the slidable movement of said valve to connect more of said rotors to begin rotation of said shaft, and means controlled by the increased rotation of said shaft to slidably actuate said valve to decrease the number of rotors connected with said pressure source.

2. A transmission comprising a source of fluid pressure, a plurality of fluid driven rotors, a driven shaft on which said rotors are mounted, means connecting said fluid pressure source to said rotors, valve means slidably mounted in said connecting means, said valve means controlling the flow of pressure fluid to all but one of said rotors, said valve adapted to connect more of said rotors to said source of pressure to begin rotation of said shaft, and means actuated by an increase in rotation of said shaft to decrease the number of rotors connected to said pressure source.

3. A fluid transmission comprising a source of fluid pressure, a shaft, a series of rotors mounted on said shaft, means connecting said rotors to said source of fluid pressure, a single valve slidably mounted in said connecting means, said valve adapted to connect more of said rotors to said connecting means upon an increase of pressure in said connecting means, said rotors adapted to begin rotation of said shaft, means connecting said slidable valve to said shaft, and said slidable valve actuated to decrease the number of rotors connected to said source of pressure upon an increase in rotation of said shaft.

4. A fluid transmission comprising a plurality of rotors, a source of fluid pressure, a shaft upon which said rotors are mounted, means connecting said rotors to said source of fluid pressure, a single valve, said single valve slidably mounted within said connecting means, said slidable valve being adapted to connect more of said rotors to said source of fluid pressure upon an increase of pressure in said connecting means to begin rotation of said shaft, and means actuated by an increase in rotation of said shaft to decrease the number of rotors connected with said source of pressure.

WILLIAM A. ROTH.